Oct. 4, 1927.
C. T. HATCH
1,644,472
POULTRY COOP OR CRATE
Filed Nov. 18, 1925    2 Sheets-Sheet 1
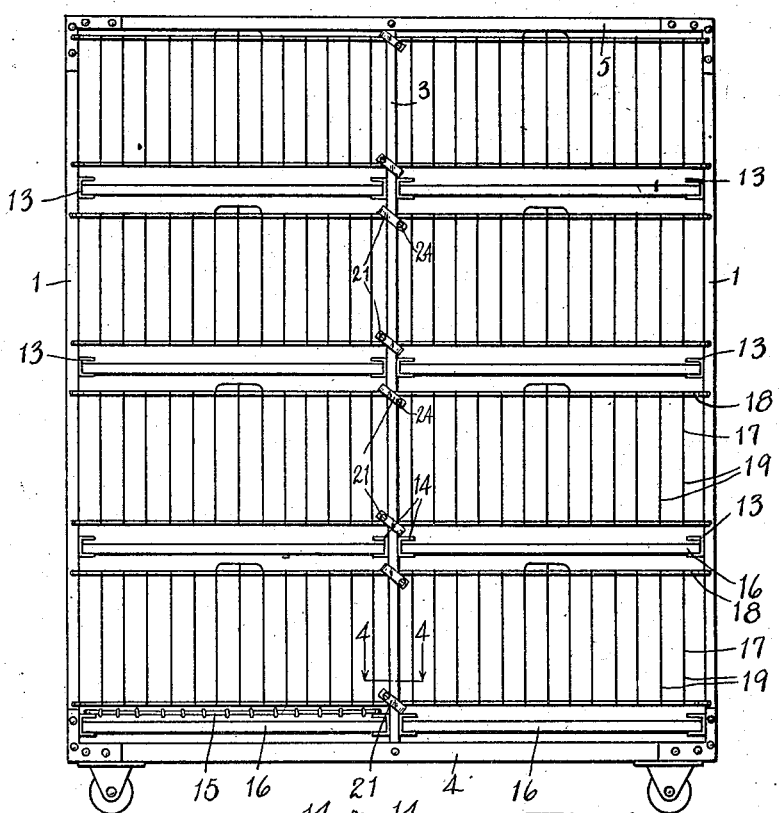
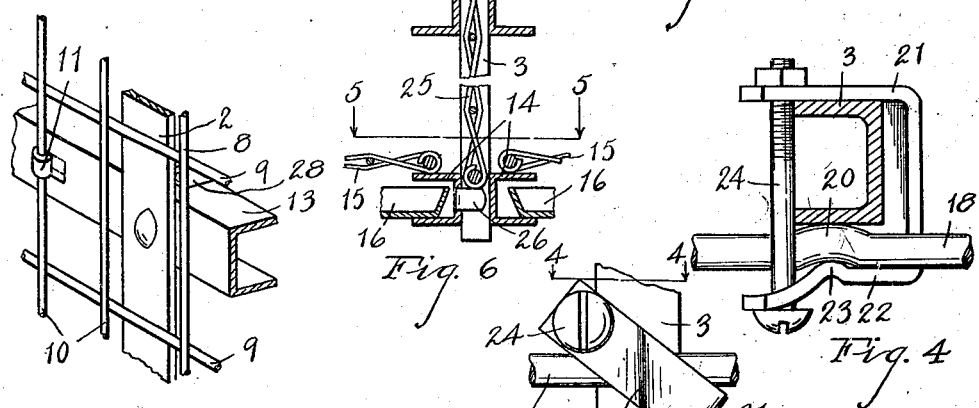
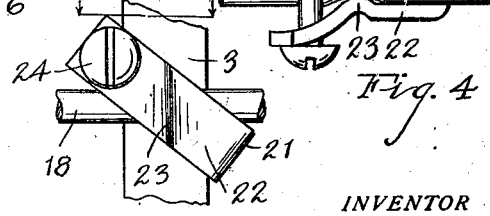
INVENTOR
Charles T. Hatch
BY
Chappell & Earl
ATTORNEYS

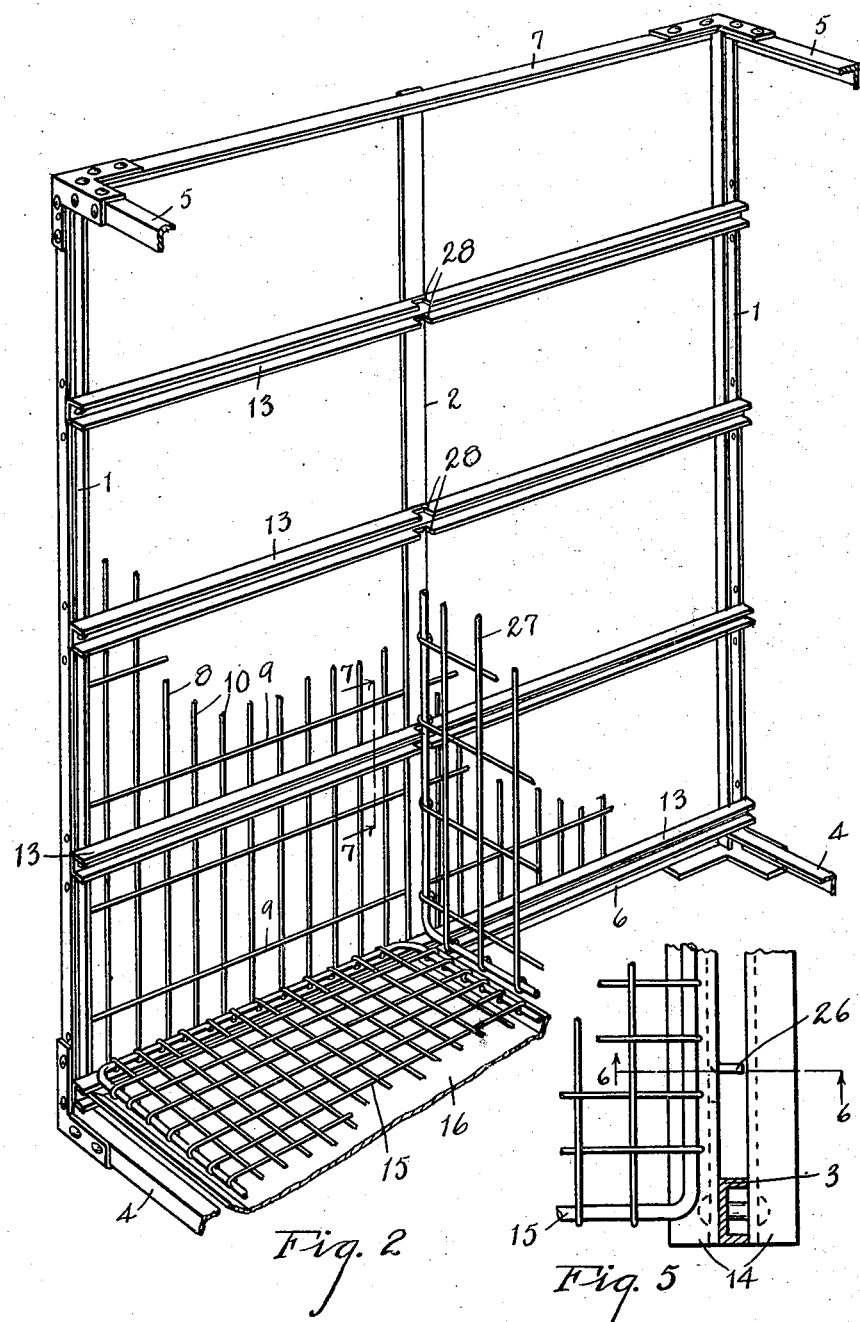

Patented Oct. 4, 1927.

1,644,472

UNITED STATES PATENT OFFICE.

CHARLES T. HATCH, OF ALBION, MICHIGAN, ASSIGNOR TO UNION STEEL PRODUCTS COMPANY, OF ALBION, MICHIGAN.

POULTRY COOP OR CRATE.

Application filed November 18, 1925. Serial No. 69,898.

The main objects of this invention are:

First, to provide an improved poultry coop or crate in which the parts are quite simple and economical to produce and easily assembled.

Second, to provide an improved poultry coop or crate having these advantages which is very strong and rigid.

Objects relating to details and economies of construction and operation of my invention will definitely appear from the detailed description to follow.

The invention is clearly defined and pointed out in the claims.

A structure which is a preferred embodiment of my invention is illustrated in the accompanying drawing, forming a part of this application, in which:

Fig. 1 is a front elevation of a poultry coop or crate embodying the features of my invention, the partition walls being omitted for convenience in illustration.

Fig. 2 is a fragmentary inside perspective view.

Fig. 3 is an enlarged fragmentary view showing details of connecting the parts.

Fig. 4 is a detail horizontal section on a line corresponding to line 4—4 of Fig. 3.

Fig. 5 is a detail horizontal section on a line corresponding to line 5—5 of Fig. 6 showing details of the floor supporting ledges and the partition supports.

Fig. 6 is a detail vertical section on a line corresponding to line 6—6 of Fig. 5.

Fig. 7 is a fragmentary perspective view on a line corresponding to line 7—7 of Fig. 2 showing details of the end panel attaching means.

In the drawing similar reference characters refer to similar parts throughout the several views, and the sectional views are taken looking in the direction of the little arrows at the ends of the section lines.

Referring to the drawings, I provide a frame comprising corner uprights 1, intermediate end uprights 2 and intermediate side uprights 3. The horizontal side members 4 and 5 and the bottom and top horizontal end members 6 and 7 are connected to the uprights by corner irons substantially as shown in the Wiselogel Patent No. 1,359,643. The uprights are, in the structure illustrated, formed of channel iron, the end uprights being arranged with their channels facing inwardly.

The end wall panels 8 are made up of horizontal bars 9 and vertical bars 10 secured together by spot welding. These wall panels are engaged with tongues 11 and 12 struck out from the webs of the floor ledges, one or more of the tongues 12 being bent around the bars 9 engaged therewith, thereby effectively securing the panels in position.

The structure illustrated has a plurality of floors or decks providing a series of coops one above the other. The floor ledges 13 are secured on the inner sides of the corner uprights while corresponding ledges 14 are secured back to back on the intermediate upright 3. These ledges are of channel cross section, the grid floors 15 resting upon the top or the upper legs of the ledges while pans 16 slide between the legs of the ledges.

The side panels, designated generally by the numeral 17, are formed of longitudinal bars 18 and vertical slats 19. These longitudinal bars have offsets 20 therein adjacent the uprights 3. The ends of the bars 18 are secured to the corner uprights.

U-shaped clips 21 embrace the uprights 3 and the bars 18, as shown in Fig. 4, the outer arms 22 of the clips having kinks or offsets 23 therein engaging the offsets 20. The ends of these arms 22 project outwardly providing spring members which are engaged by the clamping bolts 24 so that a very secure clamping action may be had with comparatively light clips.

By this means the parts are very effectively secured and great accuracy in forming and assembling the parts is not required.

The floor ledges not only constitute means for supporting the floors but they also constitute frame members, bracing and reinforcing the frame, and also means for supporting the partitions.

The transverse vertical partition 25 is arranged between the floor ledges 14 and supported by lugs 26 struck inwardly from one of the bottom pair of ledges. The longitudinal partitions 27 are engaged in aligned notches 28 formed in the floor ledges. The partitions are thus effectively secured and the structure is simple and economical.

I have illustrated and described my improvements in an embodiment which I have found very practical. I have not attempted to illustrate or describe certain modifications and adaptations as I believe the disclosure made will enable those skilled in the art to embody or adapt my improvements as may be desired.

Having thus described my invention, what I claim as new and desire to secure by Letters Patent, is:

1. In a structure of the class described, the combination of a panel comprising corner uprights, an intermediate upright, wall panels comprising horizontal bars provided with slats, said bars being secured at their ends to said corner uprights and having inward offsets therein aligned with said intermediate upright, U-shaped clips embracing said intermediate upright and said horizontal bars, the outer arms of said clips having inward offsets therein engaging the offsets in said horizontal bars, such clip arms projecting beyond their offsets to provide spring members, and clamping bolts arranged through the arms of said clips.

2. In a structure of the class described, the combination of a panel comprising corner uprights, an intermediate upright, wall panels comprising horizontal bars provided with slats, said bars being secured at their ends to said corner uprights and having inward offsets therein aligned with said intermediate upright, U-shaped clips embracing said intermediate upright and said horizontal bars engaging the offsets in said horizontal bars, and clamping bolts arranged through the arms of said clips.

3. In a structure of the class described, the combination of a frame comprising corner uprights, an intermediate upright, wall panels comprising horizontal bars provided with slats, said bars being secured at their ends to said corner uprights and having offsets therein adjacent said intermediate upright, and clips embracing said intermediate upright and said horizontal bars engaging said offsets therein.

4. In a structure of the class described, the combination of a frame comprising an upright, wall panels comprising bars having offsets therein adjacent said upright, U-shaped clips embracing said upright and said bars, said clips having offsets therein engaging the offsets in said bars, such clip arms projecting beyond the offsets thereof to provide spring members, and clamping bolts arranged through the arms of said clips.

5. In a structure of the class described, the combination of a frame comprising an upright, wall panels comprising bars having offsets therein adjacent said upright, and clips embracing said upright and said bars engaging said offsets therein.

6. In a structure of the class described, the combination of a frame comprising corner uprights and intermediate uprights, floor supporting ledges of channel cross section secured in pairs back to back on said intermediate uprights to face outwardly and other of such ledges mounted on said end uprights to face inwardly, the legs of said ledges having aligned slots therein, one of the bottom pair of ledges on said intermediate uprights having lugs struck inwardly therefrom providing partition supports, a partition arranged between said pairs of ledges resting on said lugs, and partitions engaged in said aligned slots in said ledges.

7. In a structure of the class described, the combination of a frame comprising corner uprights and intermediate uprights, floor supporting ledges secured in pairs on said intermediate uprights to face outwardly and other of such ledges mounted on said end uprights to face inwardly, said ledges having aligned slots therein, one of the ledges on said intermediate uprights having lugs struck inwardly therefrom providing partition supports, a partition arranged between said pairs of ledges resting on said lugs, and partitions engaged in said aligned notches in said ledges.

8. In a structure of the class described, the combination of a frame comprising intermediate uprights, floor supporting ledges secured in pairs on said uprights, one of the bottom pair of ledges having lugs struck inwardly therefrom providing partition supports, and a partition arranged between said pairs of ledges resting on said lugs.

In witness whereof I have hereunto set my hand.

CHARLES T. HATCH.